(12) United States Patent
Fischer (10) Patent No.: US 8,161,812 B1
(45) Date of Patent: Apr. 24, 2012

(54) HIGH PRESSURE FLUID METER

(75) Inventor: Ge Fischer, Essen (BE)

(73) Assignee: The Gas Measurement Group, Inc., Buffalo, WY (US)

( * ) Notice: Subject to any disclaimer, the term of this patent is extended or adjusted under 35 U.S.C. 154(b) by 300 days.

(21) Appl. No.: 12/635,406

(22) Filed: Dec. 10, 2009

Related U.S. Application Data (60) Provisional application No. 61/139,351, filed on Dec. 19, 2008.

(51) Int. Cl.
*G01F 3/04* (2006.01)
*G01F 15/14* (2006.01)
(52) U.S. Cl. .......................... 73/261; 73/273
(58) Field of Classification Search ........................ None
See application file for complete search history.

(56) References Cited

U.S. PATENT DOCUMENTS

| | | | | |
|---|---|---|---|---|
| 4,815,318 A * | 3/1989 | LoPresti | .......................... | 73/261 |
| 5,548,998 A * | 8/1996 | Roberts | .......................... | 73/263 |
| 6,244,844 B1 * | 6/2001 | Diaz | .......................... | 418/201.3 |

* cited by examiner

*Primary Examiner* — Harshad Patel
(74) *Attorney, Agent, or Firm* — Buskop Law Group, PC; Wendy Buskop (57) ABSTRACT

A high pressure rotary gas meter is described herein with an exchangeable cartridge which has a meter body surrounded by an open bracket. The meter body can have a chamber in fluid communication with an inlet and an outlet. An impeller can be located in the chamber and can include a plurality of rotors connected to a gear box and a meter index to display flow information. A counter can be coupled to the meter index, for counting revolutions of the rotors and for translating the revolutions into a measurement of fluid volume. A removable first sleeve insert and second sleeve insert can permit fluid to flow into the inlet port and out of the outlet port while simultaneously securing the bracket to the meter body.

19 Claims, 5 Drawing Sheets

HIGH PRESSURE FLUID METER

CROSS REFERENCE TO RELATED APPLICATIONS

The present application claims priority and benefit of U.S. Provisional Patent Application Ser. No. 61/139,351 filed on Dec. 19, 2008, entitled "HIGH PRESSURE FLUID METER". This reference is hereby incorporated in its entirety.

FIELD

The present embodiments relate to a high pressure rotary gas meter with a lightweight bracket for ease of transport.

BACKGROUND

A need exists for a high pressure rotary gas meter with a lightweight removable bracket.

A further need exists for a high pressure rotary gas meter with an exchangeable cartridge.

A need exists for an open lightweight bracket secured over a meter body by removable inserts.

A need exists for a means for counting revolutions of rotors that has easily removable sleeve inserts for each high pressure inlet and outlet port that simultaneously can serve the purpose of holding the lightweight bracket to the meter body.

The present embodiments meet these and other needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a rotary gas meter with a cartridge. The cartridge can be an exchangeable cartridge, such that one cartridge within the rotary gas meter can be removed, and another cartridge can be placed in the same rotary gas meter.

The rotary gas meter can be a high pressure rotary gas meter and can be a positive displacement meter. Rotary gas meters or positive displacement meters are used on a very large scale in low and medium pressure distribution networks.

Embodiments of the rotary gas meter can be used to monitor a fluid flow of natural gas, other hydrocarbons, or other fluids. The rotary gas meter can measure fluid flow from a well or fluid flow in a pipeline. Embodiments can measure fluid that can be substantially particle-free due to low tolerance.

Embodiments of the rotary gas meter can include rotary gas meters that are lightweight, such as about fifty percent lighter than a traditional steel body rotary gas meter. The lightweight rotary gas meter can cost less to ship, can cost less in materials to manufacture, and can cost less to machine and handle than currently existing rotary gas meters for high pressure applications.

Embodiments can include a rotary gas meter that can be used on high pressure natural gas and other high pressure fluid transmission lines. Low pressure meters are not typically used in high pressure environments because threads integrated into the flanged meter body to connect the meter to adjacent piping can be damaged. This causes unsafe conditions and even leading to explosions. Embodiments of the present rotary gas meter include a meter body that is not flanged or threadably engaged with adjacent piping.

Typically, for high pressure class ANSI 300/600 applications, the meter bodies are made of solid steel, creating a rigid connection for the performance of the meter. A drawback of meter bodies made of solid steel is the size and weight of the meter body. In fact, the weight of a steel bodied meter can require that adjacent piping have additional support, and a lifting crane can be needed to install the steel bodied meter in the pipeline.

Embodiments of the invention do not require the use of a crane for installation of the rotary gas meter and cartridge. Additional support for the piping is also not needed. These are significant safety advantages during installation of the rotary gas meters, which can prevent accidents.

The rotary gas meter can operate by displacing a defined amount of gas with each rotation of an impeller having at least two rotors inside a chamber of a cartridge. The amount of gas displaced can be defined by the chamber inside the cartridge.

The cartridge can include a means for counting that can be easily removed and installed within a bracket, which can be an open lightweight bracket. The bracket can have low machining tolerances and can have no requirements with respect to leakage. The low machining tolerances of the bracket can lead to lower production costs compared to other high pressure rotary gas meters. Additionally, embodiments of the bracket require no hydrostatic pressure testing, which are sometimes required by other commercially available meters.

In embodiments, the bracket can eliminate any stress on the cartridge as the bracket and the adjacent piping are not threadably engaged with the cartridge. This can guarantee optimal metrological performance under any conditions.

The cartridge can include a meter body. The meter body can be made from a lightweight metal, such as aluminum, a composite, such as a ceramic and graphic composite, an alloy, such as an aluminum alloy, or a polymer, such as a very sturdy high density reinforced polymer.

The meter body can have a chamber for receiving high pressure fluid, which can be a gas, a vapor, a liquid, or combinations thereof. The chamber is also herein referred to as a measurement chamber.

The meter body can have an inlet for receiving the high pressure fluid and flowing it into the chamber. The meter body can have an outlet for flowing the high pressure fluid out of the chamber. The chamber can contain an impeller.

In embodiments, the impeller can be made from two rotors that can roll over each other. A first rotor can be disposed on a first bearing shaft and a second rotor can be disposed on a second bearing shaft. The bearing shafts can both engage a single gear box.

A meter index can be coupled to or otherwise in communication with the gear box, and the meter index can display flow information on a display that can be an integral part of the meter index. The flow information can include the revolutions per minute of the rotors, the flow rate of the high pressure fluid, the fluid volume of the high pressure fluid, or combinations thereof.

The impellers can be manufactured from aluminum, which can reduce the inertia of the impellers and can minimize the manufacturing cost of the impellers. In embodiments, the impeller can be a turbine, such as one made by American Meter Corporation of the United States.

The two rotors and internal walls of the chamber can provide a seal, or a fluid seal, which can eliminate gas passing through the chamber without being measured. In embodiments, the seal can be a small gap from about 0.05 millimeters to about 0.2 millimeters thick, depending on the meter body size and the performance desired of the rotary gas meter.

As the high pressure fluid flows through the chamber, the high pressure fluid can apply a force to the rotors, and the rotors can in-turn rotate from the force applied from the high pressure fluid.

A counter, or a similar device, hereinafter also referred to as "a means for counting", can be coupled to the meter index. The means for counting can count revolutions of the rotating rotors and can translate or convert the counted revolutions into a measurement of fluid volume, such as a volume of natural gas. The means for counting can be a volume corrector or mechanical counter.

Each rotation of a rotor can displace a predefined volume of gas or fluid through and out of the chamber. The predefined volume of gas or fluid can be equivalent to a volume of space defined by the chamber walls and the rotors. As each rotation of a rotor displaces a predefined volume of gas or fluid, the means for counting can count the number of rotations of the rotors and can calculate a fluid volume by using the predefined volume.

The bracket can be disposed around the meter body. In embodiments, the bracket can be formed from a pipe which can be formed by removing or cutting out large portions of the pipe and leaving only a front bracket portion, a back bracket portion, and two panels connecting the front and back brackets together. Forming the bracket in this manner can produce a bracket with a substantial amount of support by using the thickness of the pipe wall, while simultaneously producing a lightweight bracket by using only a minimum amount of material of the pipe to form the bracket.

The open lightweight bracket, as opposed to a pressured bracket, can be designed in such a way that installation stresses caused by adjacent pipeline or by misalignment of flanges can be endured by the bracket without any significant deformity. Limiting deformation of the bracket can reduce or eliminate any stress being transferred to the cartridge, thereby reducing or eliminating any affect on the cartridge in the chamber.

The bracket can have a first bracket port disposed on a first side of the bracket, and a second bracket port disposed on a second side of the bracket. Each bracket port can have a mounting plate, which can have an outer flange and an inner flange. Each bracket outer flange can have a plurality of holes.

A first sleeve insert can be inserted through the first bracket port and into the inlet port of the meter body. The first sleeve insert can include a first sleeve flange, which can engage the inner flange of the first bracket port. This secures the bracket to the meter body on a first side of the meter body.

The first sleeve insert can permit high pressure fluid to flow from an outside source into the chamber, while simultaneously supporting the bracket. The first sleeve insert can removably engage the inlet port.

A second sleeve insert can be inserted through the second bracket port and into the outlet port of the meter body. The second sleeve insert can include a second sleeve flange which can engage the inner flange of the second bracket port. This secures the bracket to the meter body on a second side of the meter body.

The second sleeve insert can permit the high pressure fluid to flow from the chamber and out of the meter body, while simultaneously supporting the bracket. The second sleeve insert can removably engage the outlet port.

In embodiments, the first and second sleeve inserts can threadably engage the inlet and outlet ports.

In operation, a high pressure fluid can flow from a first adjacent pipe into the inlet port through the first sleeve insert. The high pressure fluid can then flow into, through, and out of the chamber, which applies a force or pressure to the means for counting, such as the rotors. The applied force can cause the rotors to rotate. The rotors can rotate and displace a predefined volume of fluid. The rotors can then transfer a rotational energy of the rotors to a gear box, which can in-turn transfer the rotational energy to a meter index.

By relating the revolutions per minute of the rotors to the predefined volume of fluid, a counter coupled to the meter index can convert the revolutions per minute into a measurement of fluid volume. A display can display flow information, such as the measured fluid volume, for a user to see.

The inlet and outlet diameters can be identical. The sleeve inserts can have conical insert portions or a sleeve body. The sleeve inserts can each have a sleeve flange which can have an inner diameter identical to the inlet and outlet. The sleeve flange can have an outer diameter that can be about 10 percent larger than the sleeve flange inner diameter.

The sleeve inserts can each provide a connection between adjacent piping and the cartridge by engaging both the adjacent piping and the cartridge. Each sleeve flange can have a sleeve flange face which can engage a piping flange face.

The sleeve inserts can be made of stainless steel, which can give maximum protection against corrosion to a face of the sleeve flange.

The sleeve inserts can be machined to have various flange face types, shapes, pressure class ratings, ring joints, smooth finishes, stock finishes, and other variations depending upon the particular use of the sleeve inserts. The sleeve inserts can be machined to meet various needs for various user specified logistical advantages.

In embodiments, each sleeve insert can have a cylindrical sleeve body and on one end of each sleeve insert, the sleeve flange can be secured to the cylindrical sleeve body.

A first sealing means can be disposed between the first sleeve insert and the inlet port, and a second sealing means can be disposed between the second sleeve insert and the outlet port. The sealing means can be elastomeric o-rings, a plurality of rubber o-rings, synthetic rubber o-rings, or another material such as a silicon gasket. The sealing means can cause sealing to occur between the sleeve inserts and the ports, while enabling the sleeve body to be removable from the meter body. In embodiments, the sealing means can be metal to metal seals.

The rotary gas meter can provide a leak free and pressure tight connection to the adjacent piping through the use of gaskets or O-rings that do not affect the measurement chamber dimensions, thereby increasing the reliability of the rotary gas meter by more than 20 percent when compared to conventional meters.

For optimum functioning, optimum metrological performance, and an optimum usable range of the rotary gas meter, the dimension of the chamber and the fluid seal can be constant and unchanged by external stresses and forces. A small change of the dimension of the measurement chamber can change the accuracy of the rotary gas meter. A small change of the fluid seal can cause an unregistered leakage from the rotary gas meter and can change the accuracy at lower capacities of the rotary gas meter.

In embodiments, the measurement chamber, the entire meter body, and the rotors can be made of the same material, which can avoid changes of the dimensions of the fluid seal due to thermal expansion. However, the meter body in an embodiment, can be made of a first material, the chamber can be laminated, lined, or coated with a second material, and the rotors can be made of a third material.

In embodiments, a wireless meter transmitter, such as those made by Mercury Instruments of Ohio, can be coupled or otherwise in communication with the meter index. The wireless transmitter can transmit the flow information from the rotary gas meter to a client device, such as a cell phone, a computer, or another receiver that can be remote from the rotary gas meter, which allows for remote monitoring of the rotary gas meter.

In embodiments, the meter body can be centered within the bracket, such that the meter body extends beyond the edges of the bracket.

In embodiments, the meter body can be centered within the open lightweight bracket and around the first and second sleeve inserts. An inlet pipe for introducing the high pressure fluid can be secured to the bracket mounting plate on a first side. The inlet pipe can include an inlet pipe outer flange and an inlet pipe inner flange.

The inlet pipe outer flange can have a plurality of holes, which can be aligned with the plurality of holes in the outer bracket flange. A bolt or another fastening means can simultaneously engage through the plurality of holes in the inlet pipe outer flange and the outer bracket flange, thereby securing the inlet pipe to the bracket.

The inlet pipe inner flange can engage the sleeve flange face.

An outlet pipe can be secured to the bracket mounting plate on a second side. The outlet pipe can include an outlet pipe outer flange and an outlet pipe inner flange.

The outlet pipe outer flange can have a plurality of holes which can be aligned with the plurality of holes in the outer bracket flange. A bolt or another fastening means can simultaneously engage through the plurality of holes in the outlet pipe outer flange and the outer bracket flange, thereby securing the outlet pipe to the bracket.

The outlet pipe inner flange can engage the sleeve flange face.

In embodiments, the mounting plates can form threaded engagements with the inlet and outlet pipes. The mounting plates can be circular plates from about ¼ inches to about ½ inches thick and can be made of solid steel. The mounting plates can have a hole in the center of the mounting plates, which allows flow of the high pressure fluid into, through, and out of the chamber.

The mounting plates or the flanges can be of different sizes and different geometric shapes.

The rotary gas meter can be installed in pipe lines or metering skids using flange-to-flange connections. The adjacent piping, which can be the inlet and outlet pipes, can be can be made from steel.

The rotary gas meter can be highly effective, as bolts from the piping that connect into the plurality of holes of the mounting plates can prevent any misalignment between the flanges of the mounting plate and the flanges of the adjacent piping. A misalignment can cause stress in the meter body, which can affect the dimensions of the chamber and the fluid seal. The flange-to-flange connection can be more effective at producing accurate measurements of flow information than other types of connections.

In embodiments, the rotary gas meter can lock when the fluid seal fails due to a stress. Also, the rotary gas meter can interrupt the flow of high pressure fluid when the fluid seal fails. The rotary gas meter can permit a bypass of the high pressure fluid without measuring the flow rate of the bypassed high pressure fluid.

In embodiments, a plurality of the rotary gas meters can be connected together in parallel to handle large capacity metering of high pressure fluids.

The open lightweight bracket can allow versatility in interchangeable cartridges, as various interchangeable cartridge sizes can be installed in a single bracket. The open lightweight bracket can therefore eliminate the need for the bracket to be sized to a specific cartridge size, producing a flexibility in cartridge and bracket usage that has previously not existed. The open lightweight bracket can be reusable.

The bracket can be made of any type of steel, another rigid metal, or a metal alloy. The bracket can be made from a piece of pipe with two flanges welded to the piece of pipe, which allows for fast and easy construction of the bracket. This construction can enable the rotary gas meter to be assembled at least 25 percent faster than other meters that can require custom parts. The bracket can be machined to reduce the weight of the bracket.

In embodiments, the bracket can have a first cylindrical support which can be secured to a first panel and a second panel. The two panels can be disposed directly opposite each other. A second cylindrical support can be secured to the first and second panels as well, opposite the first cylindrical support. A first mounting plate can be secured to the first panel, and a second mounting plate can be secured to the second panel.

The thickness of the cylindrical supports can be from about ¼ inches to about ½ inches, and the cylindrical supports can be made from steel or another metal. Perforations can be disposed in the cylindrical supports to further lower the weight of the cylindrical supports.

The first and second panels can be from about 3 inches to about 8 inches in height and can have a thickness from about ¼ inches to about ½ inches. The length of the bracket can be from about 3 inches to about 8 inches.

In embodiments, the meter body with the attached meter index can be from about 8 inches to about 18 inches in length. The meter body can have a diameter from about 4 inches to about 6 inches, which enables small cartridges to be used within the bracket. The meter body can be inserted inside the bracket.

The inlet and outlet ports of the meter body can be from about 2 inches to about 4 inches in diameter, which allows for a significant high pressure fluid flow at a rate from about 20 cubic feet per second to about 3000 cubic feet per second.

The meter body and the entire cartridge can be made of aluminum, which can guarantee or provide optimum performance and the highest possible accuracy of measurement over a very large temperature range. The accuracy of the measured fluid volume by the rotary gas meter can be within 0.1 percent of the actual fluid volume for temperatures ranging from about −40 degrees Fahrenheit to about 200 degrees Fahrenheit.

The meter body can be formed of other lightweight metals or metal alloys. The meter body can be laminated such that there can be sufficient strength in the laminate or the meter body to prevent any deformation of the rotary gas meter in the presence of a high pressure fluid at a pressure of at least 1000 psi.

The degree of thermal expansion of the cartridge, the rotors, the bearing shafts, and other parts of the meter body can be similar or equal.

The cartridge can be formed with dimensions such that the cartridge provides an internal line pressure that can be small or negligible, as compared to stresses caused by the installation of the rotary gas meter.

When forming the meter body, the walls of the meter body can be formed with various thickness depending upon the size and pressure of the high pressure fluid that is to flow through the rotary gas meter during operation.

The meter body can sustain pressure in class ANSI 300 and class ANSI 600. The meter body can support fluid flow temperatures up to about 180 degrees Fahrenheit without melting or otherwise deforming.

Embodiments will be more fully described below in the Figures, including a full flange type embodiment and a compact version embodiment with threaded connections.

Figure 1:
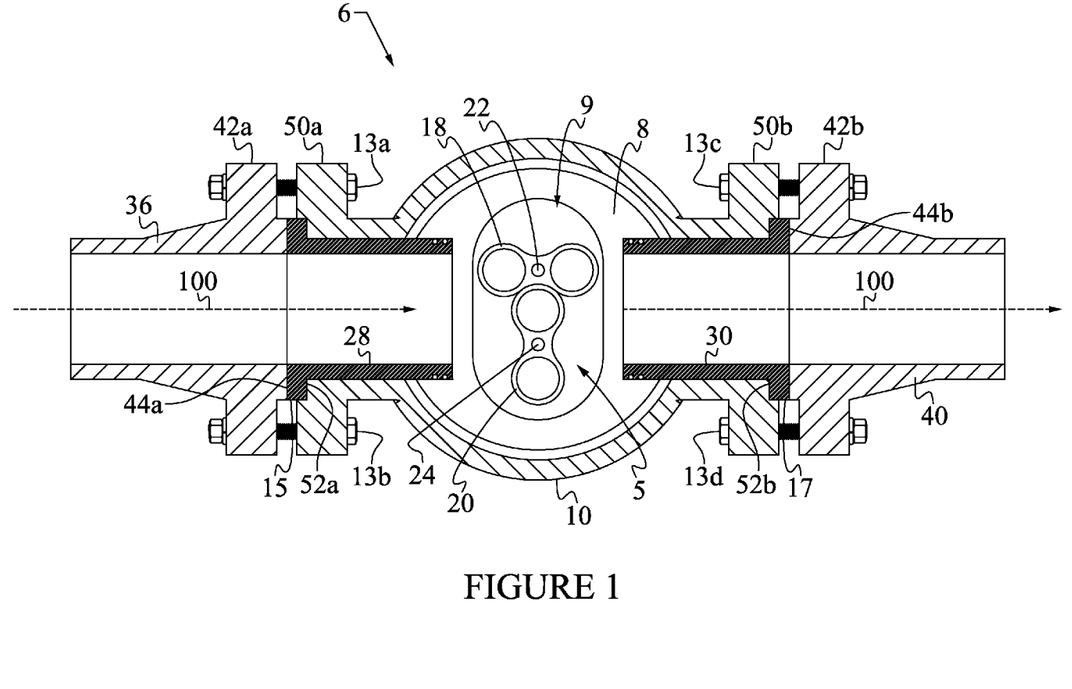
FIG. 1 depicts a cross section of the rotary gas meter.

Turning now to the Figures, FIG. 1 shows a cross section of the meter body, noting in particular the impeller of the rotary gas meter shown with a bracket with sleeve inserts for engaging adjacent pipe flanges, which fully relieves the cartridge from installation stresses caused by the adjacent piping, ensuring a higher accuracy rotary gas meter.

The exchangeable cartridge 6 is shown with a meter body 8 having a chamber 9.

The impeller 5 is shown in the center of the chamber 9 formed by a first rotor 18 on a first bearing shaft 22 and a second rotor 20 on a second bearing shaft 24.

A first sleeve insert 28 is shown in engagement with the meter body 8, permitting a high pressure fluid 100 to flow into the chamber 9. The first sleeve insert can be removably connected to the meter body. A second sleeve insert 30 is shown engaged with the meter body, allowing the high pressure fluid to exit the chamber.

An inlet pipe outer flange 42a of an inlet pipe 36 is shown connected to a first outer flange 50a of a bracket 10 with fastening means 13a and 13b. The inlet pipe is also shown in fluid communication with the first sleeve insert 28.

An outlet pipe outer flange 42b of an outlet pipe 40 is shown connected to a second outer flange 50b of the bracket 10 with fastening means 13c and 13d. The outlet pipe is also shown in fluid communication with the second sleeve insert 30.

A first sleeve flange 15 is shown engaged with a first inner bracket flange 52a and an inlet pipe inner flange 44a, providing fluid communication between the inlet pipe and the chamber 9.

A second sleeve flange 17 is shown engaged with a second inner bracket flange 52b and an outlet pipe inner flange 44b, providing fluid communication between the outlet pipe and the chamber 9.

In operation, the connection of the inlet and outlet pipes with the bracket keeps the inlet and outlet pipes in engagement with the bracket and in fluid communication with the chamber. Also, the engagement of the sleeve flanges with the inlet and outlet pipes keeps the inlet and outlet pipes in fluid communication with the chamber.

The pressure engagement between the sleeve inserts and the bracket keeps the bracket engaged with the meter body without having to thread or otherwise directly fasten the bracket to the meter body.

Figure 2:
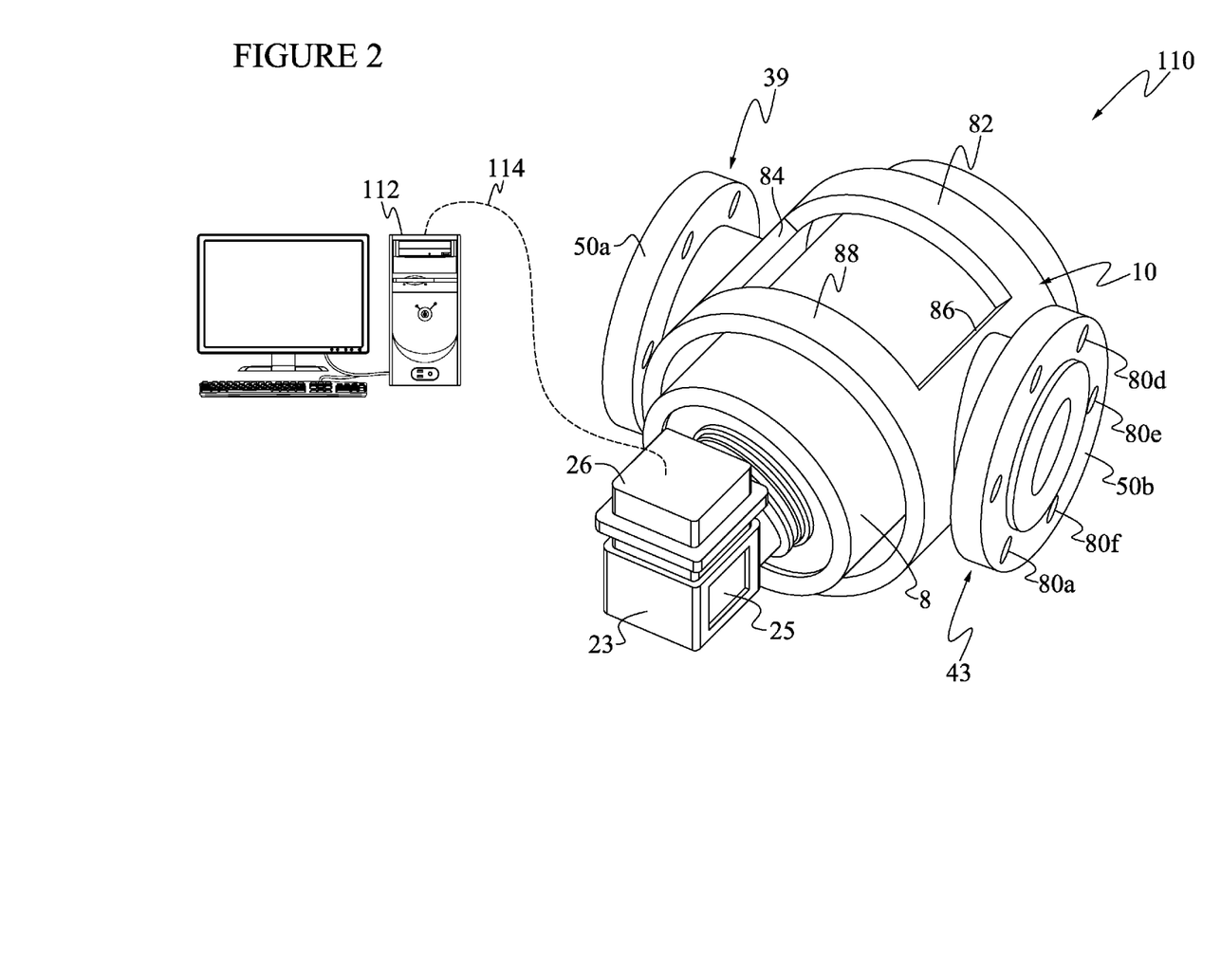
FIG. 2 depicts an embodiment of the rotary gas meter.

FIG. 2 depicts an embodiment of a high pressure rotary gas meter 110.

The meter index 23 is shown with a display 25 for displaying counting or other measurement or flown information.

The meter body 8 is shown housed centrally within the open lightweight bracket 10. A means for counting 26 is shown adjacent the meter index. The means for counting can be a means for counting the revolutions of the rotors and translating the counted revolutions into a measurement of gas volume. For example, a means for counting can be a pulse index made by American Meter Company which can count about 1 revolution per minute for a gas flow of about 10 cubic feet per second, and can display that counted volume on the display.

A first mounting plate 39 and a second mounting plate 43 are shown. Each mounting plate is shown with a bracket outer flange 50a and 50b. A plurality of holes 80a, 80d, 80e, and 80f are shown disposed on the bracket outer flange 50b.

A client device 112 is shown in communication with the means for counting 26 for receiving flow information 114.

Additionally, FIG. 2 depicts a first cylindrical support 82 connected to a first panel 84 and a second panel 86. A second cylindrical support 88 is also shown connected to the first panel and the second panel.

Figure 3:
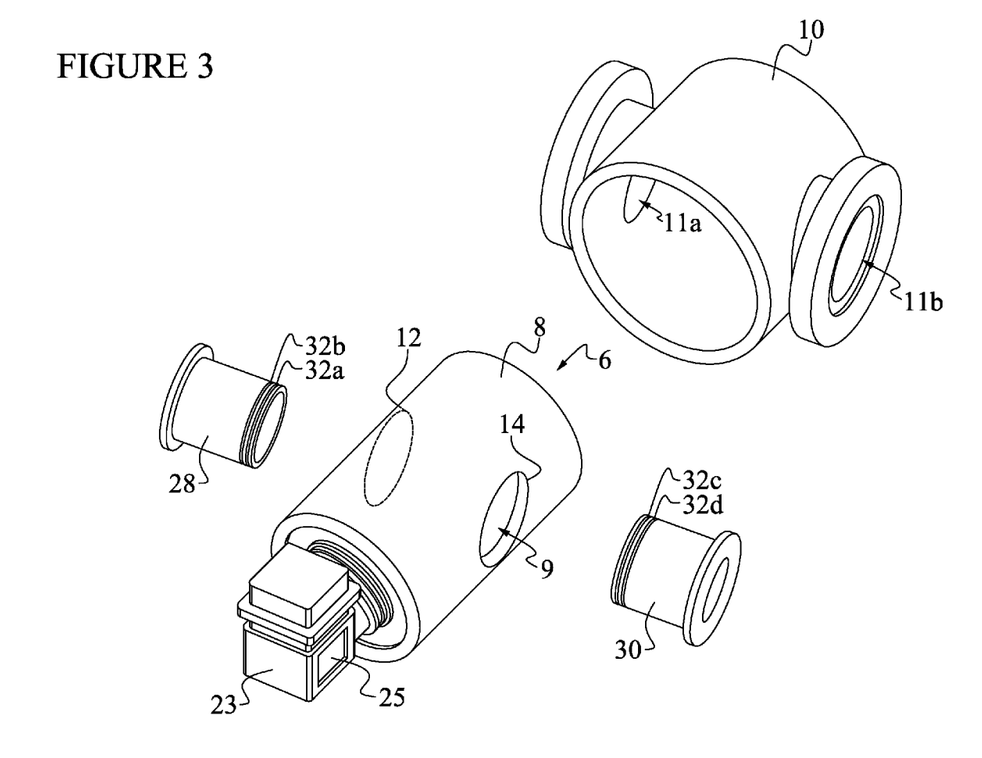
FIG. 3 depicts an exploded view of the rotary gas meter.

FIG. 3 shows an exploded view of an embodiment of the rotary gas meter. The bracket 10 is shown disconnected from the meter body 8. The bracket is shown with a first bracket port 11a and a second bracket port 11b.

The entire exchangeable cartridge 6 is shown with the meter index 23 and the display 25.

An inlet 12 and an outlet 14 are shown in fluid communication with the chamber 9 through the meter body.

The first sleeve insert 28 is shown with sealing means 32a and 32b. The second sleeve insert 30 is shown proximate the outlet 14 with sealing means 32c and 32d. The sealing means can be elastomeric o-rings, which can be from about 2 inches to about 3 inches in diameter, and can be o-rings available from conventional supply houses.

Figure 4:
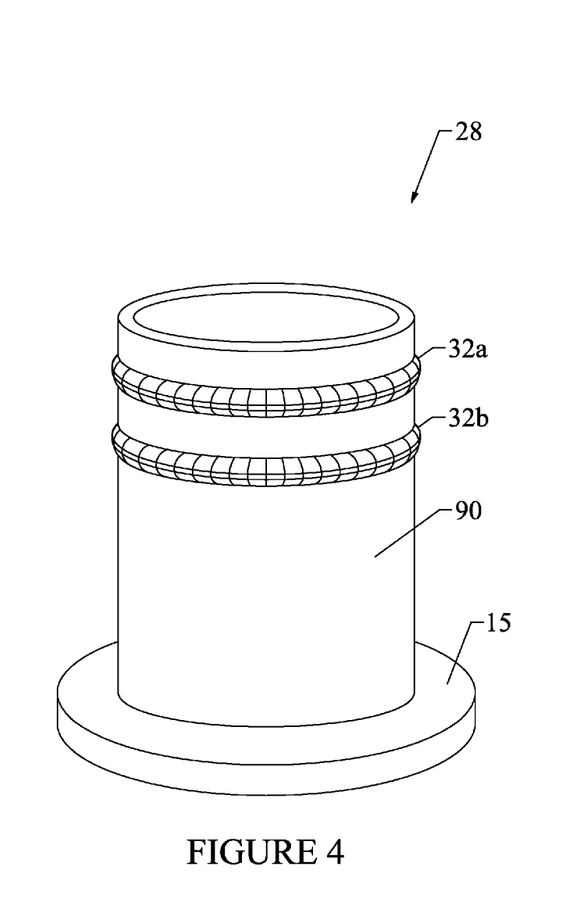
FIG. 4 depicts a detailed view of a sleeve insert.

FIG. 4 is a detail of a sleeve insert, here the first sleeve insert 28, having a sleeve body 90, a sleeve flange 15, and two sealing means 32a and 32b.

Figure 5:
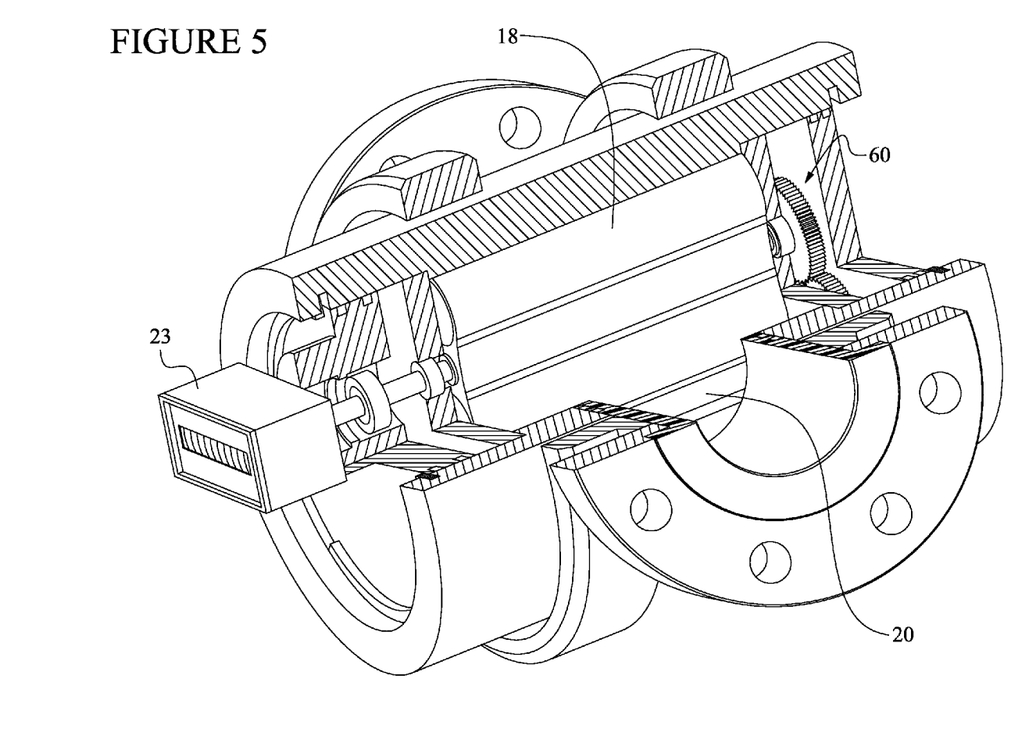
FIG. 5 is a cut view of the rotary gas meter.

FIG. 5 is a cut view of the rotary gas meter. The first rotor 18 and the second rotor 20 are shown engaged with a gear box 60 and with the meter index 23. The first rotor can rotate over the second rotor using the gear box.

While these embodiments have been described with emphasis on the embodiments, it should be understood that within the scope of the appended claims, the embodiments might be practiced other than as specifically described herein.

What is claimed is:

1. A high pressure rotary fluid meter comprising:
 a. an exchangeable cartridge comprising:
  (i) a meter body having a chamber;
  (ii) an inlet formed in the meter body for flowing high pressure fluid from an external source into the chamber;
  (iii) an outlet formed in the meter body for flowing the high pressure fluid out of the chamber;
  (iv) a first rotor connected to a first bearing shaft disposed in the chamber;
  (v) a second rotor connected to a second bearing shaft disposed in the chamber, wherein the first and second rotors are adapted to rotate as the high pressure fluid flows through the chamber;
  (vi) a gear box adapted to receive the first and second bearing shafts, wherein the gear box rotates with the first and second rotors, which allows the first rotor to rotate over the second rotor;
  (vii) a meter index coupled to the gear box;

(viii) a means for counting coupled to the meter index, wherein the means for counting is adapted for counting revolutions of the first and second rotors and for converting the counted revolutions into a measurement of fluid volume of the high pressure fluid flowing through the chamber; and (ix) a display coupled with the meter index for displaying flow information, wherein the flow information comprises the counted revolutions, the measurement of fluid volume, a flow rate, or combinations thereof;

b. an open lightweight bracket removably and centrally disposed over the meter body, wherein the open lightweight bracket comprises a first bracket port and a second bracket port;

c. a first sleeve insert removably engaged within the inlet and the first bracket port, wherein the first sleeve insert is in fluid communication with the chamber; and d. a second sleeve insert removably engaged within the outlet and the second bracket port, wherein the second sleeve is in fluid communication with the chamber, further wherein the first and second sleeve inserts are adapted to permit the high pressure fluid to flow into and out of the chamber while simultaneously securing the open lightweight bracket to the meter body.

2. The high pressure rotary fluid meter of claim 1 further comprising:
   a. a first sealing means disposed between the first sleeve insert and the inlet; and
   b. a second sealing means disposed between the second sleeve insert and the outlet.

3. The high pressure rotary fluid meter of claim 1, wherein the means for counting is a wireless meter transmitter.

4. The high pressure rotary fluid meter of claim 3 further comprising a client device in communication with the wireless meter transmitter, wherein the client device is adapted to receive the flow information from the wireless meter transmitter.

5. The high pressure rotary fluid meter of claim 1, wherein the means for counting is a mechanical counter or a volume corrector.

6. The high pressure rotary fluid meter of claim 1 further comprising an inlet pipe threadably engaged with the first bracket port, and an outlet pipe threadably engaged with the second bracket port.

7. The high pressure rotary fluid meter of claim 1, wherein the high pressure fluid is a gas, a vapor, a liquid, or combinations thereof.

8. The high pressure rotary fluid meter of claim 1, wherein the meter body is centered within the open lightweight bracket using the first and second sleeve inserts.

9. The high pressure rotary fluid meter of claim 1, wherein the first bracket port comprises a first mounting plate with a first outer flange and the second bracket port comprises a second mounting plate with a second outer flange.

10. The high pressure rotary fluid meter of claim 9 further comprising:
    a. an inlet pipe secured to the first outer flange and engaged with the first sleeve insert; and
    b. an outlet pipe secured to the second outer flange and engaged with the second sleeve insert.

11. The high pressure rotary fluid meter of claim 10 further comprising:
    a. a plurality of holes disposed in the first outer flange for receiving at least one fastener from the inlet pipe; and
    b. a plurality of holes disposed in the second outer flanges for receiving at least one fastener from the outlet pipe.

12. The high pressure rotary fluid meter of claim 10, wherein the first mounting plate comprises a first inner flange engaged with the first sleeve insert, and the second mounting plate comprises a second inner flange engaged with the second sleeve insert.

13. The high pressure rotary fluid meter of claim 1, wherein the open lightweight bracket comprises:
    a. a first panel;
    b. a second panel;
    c. a first cylindrical support secured to the first panel and the second panel;
    d. a second cylindrical support secured to the first panel and the second panel opposite the first cylindrical support;
    e. a first mounting plate secured to the first panel; and
    f. a second mounting plate secured to the second panel.

14. A high pressure rotary fluid meter comprising:
    a. an open bracket comprising a first bracket port and a second bracket port;
    b. an exchangeable cartridge removably inserted within the open bracket, wherein the exchangeable cartridge comprises:
       (i) a meter body having a chamber;
       (ii) an inlet formed in the meter body for flowing high pressure fluid from an external source into the chamber;
       (iii) an outlet formed in the meter body for flowing the high pressure fluid out of the chamber;
       (iv) a first rotor connected to a first bearing shaft disposed in the chamber;
       (v) a second rotor connected to a second bearing shaft disposed in the chamber, wherein the first and second rotors are adapted to rotate as the high pressure fluid flows through the chamber;
       (vi) a gear box adapted to receive the first and second bearing shafts, which allows the first rotor to rotate over the second rotor;
       (vii) a meter index coupled to the gear box;
       (viii) a means for counting coupled to the meter index, wherein the means for counting is adapted to count revolutions of the first and second rotors and to convert the counted revolutions into flow information of the high pressure fluid flowing through the chamber; and
       (ix) a display coupled with the meter index for displaying the flow information;
    c. a first sleeve insert removably inserted within the first bracket port and within the inlet, wherein the first sleeve insert is in fluid communication with the chamber; and
    d. a second sleeve insert removably inserted within the second bracket port and within the outlet, wherein the second sleeve is in fluid communication with the chamber, further wherein each sleeve insert is adapted to permit the high pressure fluid to flow into and out of the chamber while simultaneously securing the open bracket to the meter body.

15. The high pressure rotary fluid meter of claim 14, wherein the flow information comprises a measurement of fluid volume, a flow rate, or combinations thereof.

16. The high pressure rotary fluid meter of claim 14, wherein the open bracket further comprises:
    a. a first outer flange and a first inner flange, each disposed on the first bracket port;
    b. a second outer flange and a second inner flange, each disposed on the second bracket port;
    c. a first sleeve flange disposed on the first sleeve and engaged with the first inner flange for securing the bracket to the meter body; and d. a second sleeve flange disposed on the second sleeve and engaged with the second inner flange, wherein the second sleeve flange secures the bracket to the meter body.

17. The high pressure rotary fluid meter of claim 16 further comprising:
   a. an inlet pipe with an inlet pipe outer flange secured to the first outer flange; and
   b. an outlet pipe with an outlet pipe outer flange secured to the second outer flange.

18. The high pressure rotary fluid meter of claim 17, wherein:
   a. the inlet pipe comprises an inlet pipe inner flange engaged with the first sleeve insert; and
   b. the outlet pipe comprises an outlet pipe inner flange engaged with the second sleeve insert.

19. A high pressure rotary fluid meter comprising:
   a. an open bracket;
   b. a cartridge inserted within the open bracket, the cartridge comprising:
      (i) a meter body having a chamber;
      (ii) an inlet formed in the meter body for flowing high pressure fluid into the chamber;
      (iii) an outlet formed in the meter body for flowing the high pressure fluid out of the chamber;
      (iv) a first rotor connected to a first bearing shaft disposed in the chamber;
      (v) a second rotor connected to a second bearing shaft disposed in the chamber, wherein the first and second rotors are adapted to rotate as the high pressure fluid flows through the chamber;
      (vi) a gear box adapted to receive the first and second bearing shafts;
      (vii) a meter index coupled to the gear box;
      (viii) a means for counting coupled to the meter index, wherein the means for counting is adapted to count revolutions of the first and second rotors and to convert the counted revolutions into a fluid volume of the high pressure fluid flowing through the chamber; and
      (ix) a display coupled with the meter index for displaying the fluid volume;
   c. a first sleeve insert inserted through the open bracket and engaged within the inlet, wherein the first sleeve insert is in fluid communication with the chamber; and
   d. a second sleeve insert inserted through the open bracket and engaged within the outlet, wherein the second sleeve is in fluid communication with the chamber, further wherein each sleeve insert is adapted to permit the high pressure fluid to flow into and out of the chamber while simultaneously securing the open bracket to the meter body.

* * * * *